(12) United States Patent
Shibuya

(10) Patent No.: US 8,498,475 B2
(45) Date of Patent: Jul. 30, 2013

(54) IMAGE PROCESSING APPARATUS, CONTROL METHOD AND COMPUTER-READABLE MEDIUM

(75) Inventor: Yuichiro Shibuya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/111,126

(22) Filed: May 19, 2011

(65) Prior Publication Data

US 2011/0317913 A1 Dec. 29, 2011

(30) Foreign Application Priority Data

Jun. 24, 2010 (JP) ................................. 2010-143921

(51) Int. Cl.
*G06K 9/00* (2006.01)
(52) U.S. Cl.
USPC ........................................................ 382/166
(58) Field of Classification Search
USPC ................. 382/232–233, 239–240, 242–243; 348/404.1, 420.1–422.1; 375/240.02, 240.24
See application file for complete search history.

(56) References Cited

U.S. PATENT DOCUMENTS

| | | | | |
|---|---|---|---|---|
| 5,933,249 A | 8/1999 | Shimura et al. | ............... | 358/429 |
| 6,243,416 B1 | 6/2001 | Matsushiro et al. | ........... | 375/240 |
| 7,844,120 B2 | 11/2010 | Yamamoto | ..................... | 382/232 |
| 8,331,705 B2 * | 12/2012 | Shiraishi et al. | ............... | 382/238 |
| 2002/0113898 A1 | 8/2002 | Mitsuhashi | ................... | 348/578 |
| 2011/0158522 A1 | 6/2011 | Tsujii | ............................. | 382/166 |
| 2011/0222082 A1 | 9/2011 | Tomi | .............................. | 358/1.9 |
| 2011/0229027 A1 | 9/2011 | Shibuya | ....................... | 382/166 |

FOREIGN PATENT DOCUMENTS

| | | |
|---|---|---|
| JP | 07-236062 A | 9/1995 |
| JP | 10-257488 A | 9/1998 |
| JP | 10-290391 A | 10/1998 |
| JP | 2000-358194 A | 12/2000 |
| JP | 2002-271791 A | 9/2002 |
| JP | 2004-104621 A | 4/2004 |
| JP | 2007-143082 A | 6/2007 |

* cited by examiner

*Primary Examiner* — Jose Couso
(74) *Attorney, Agent, or Firm* — Fitzpatrick, Cella, Harper & Scinto

(57) ABSTRACT

An image processing apparatus which applies processing to image data encoded by an encoding method that encodes image data by holding, for each block including the predetermined number of pixels, color information and color layout information included in that block, the apparatus comprises: a detection unit configured to detect a region including successive pixels having identical color information, the number of pixels of which is larger than a predetermined value, using the color information and the color layout information in the encoded image data; and a conversion unit configured to convert color information of a pixel corresponding to a predetermined position in the region, and layout information of a block including the pixel at the predetermined position, of a plurality of blocks including the region detected by the detection unit.

11 Claims, 18 Drawing Sheets

IMAGE

| | |
|---|---|
|  | ALL PIXELS = IDENTICAL COLOR: 1 COMBINATION |
|  | TWO COLORS: 7 COMBINATIONS |
|  | THREE COLORS: 6 COMBINATIONS |
|  | ALL PIXELS = DIFFERENT COLORS: 1 COMBINATION |

| IMAGE | FLAG |
|:---:|:---:|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

F I G. 13
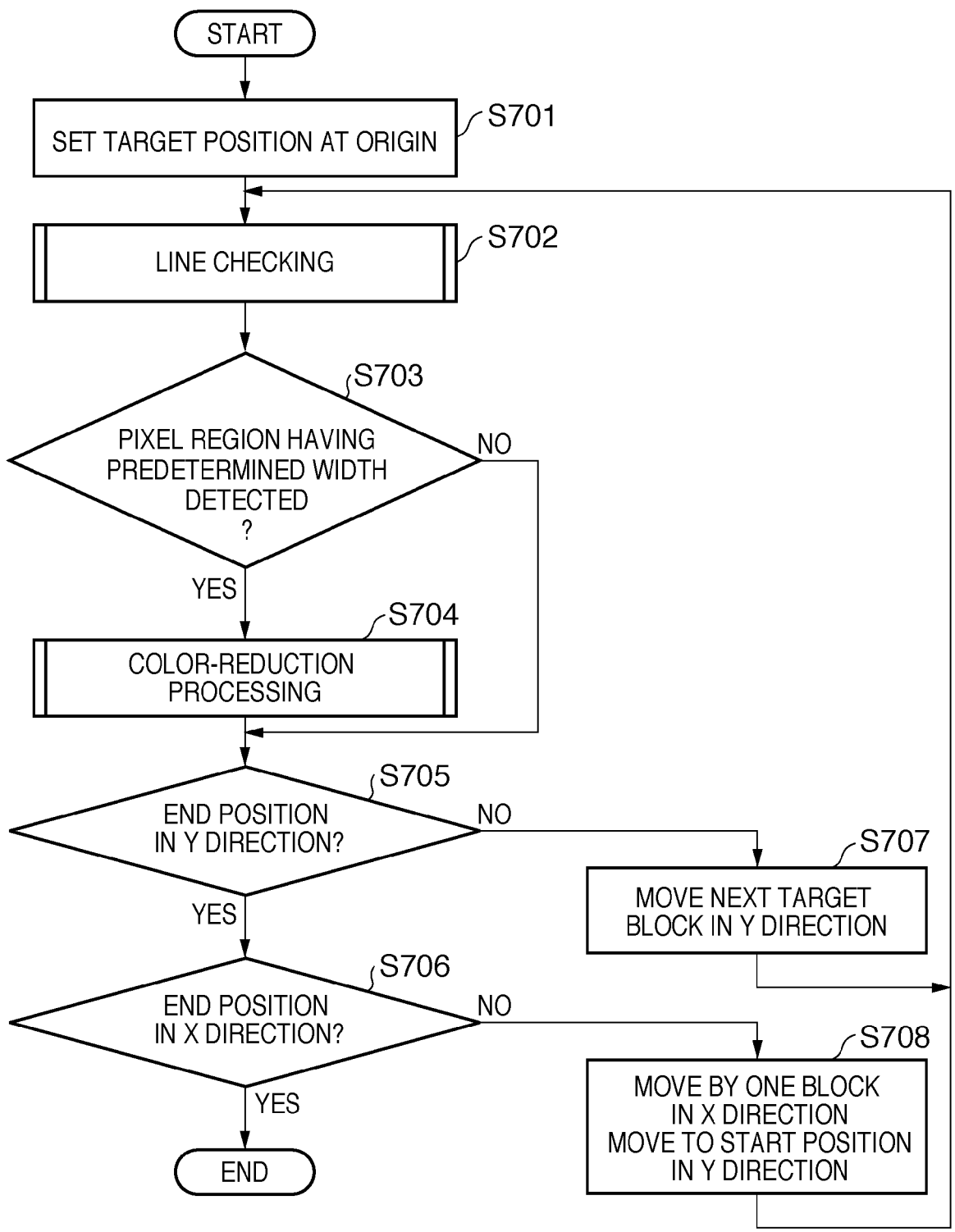

FIG. 16

| COORDINATES (X, Y) | FLAG | COLOR VALUE FIRST COLOR | COLOR VALUE SECOND COLOR | COORDINATES (X, Y) | FLAG | COLOR VALUE FIRST COLOR | COLOR VALUE SECOND COLOR |
|---|---|---|---|---|---|---|---|
| (0, 0) | 0 | (0, 0, 0) | — | (4, 0) | 0 | (0, 0, 0) | — |
| (0, 1) | 0 | (0, 0, 0) | — | (4, 1) | 0 | (255, 255, 255) | — |
| (0, 2) | 0 | (0, 0, 0) | — | (4, 2) | 0 | (255, 255, 255) | — |
| (0, 3) | 0 | (0, 0, 0) | — | (4, 3) | 0 | (255, 255, 255) | — |
| (0, 4) | 0 | (0, 0, 0) | — | (4, 4) | 0 | (255, 255, 255) | — |
| (0, 5) | 0 | (0, 0, 0) | — | (4, 5) | 0 | (255, 255, 255) | — |
| (0, 6) | 0 | (0, 0, 0) | — | (4, 6) | 0 | (255, 255, 255) | — |
| (0, 7) | 0 | (0, 0, 0) | — | (4, 7) | 0 | (0, 0, 0) | — |
| (1, 0) | 0 | (0, 0, 0) | — | (5, 0) | 0 | (0, 0, 0) | — |
| (1, 1) | 0 | (0, 0, 0) | — | (5, 1) | 0 | (255, 255, 255) | — |
| (1, 2) | 0 | (0, 0, 0) | — | (5, 2) | 0 | (255, 255, 255) | — |
| (1, 3) | 0 | (0, 0, 0) | — | (5, 3) | 0 | (255, 255, 255) | — |
| (1, 4) | 0 | (0, 0, 0) | — | (5, 4) | 0 | (255, 255, 255) | — |
| (1, 5) | 0 | (0, 0, 0) | — | (5, 5) | 0 | (255, 255, 255) | — |
| (1, 6) | 0 | (0, 0, 0) | — | (5, 6) | 0 | (255, 255, 255) | — |
| (1, 7) | 0 | (0, 0, 0) | — | (5, 7) | 0 | (0, 0, 0) | — |
| (2, 0) | 0 | (0, 0, 0) | — | (6, 0) | 0 | (0, 0, 0) | — |
| (2, 1) | 0 | (0, 0, 0) | — | (6, 1) | 0 | (255, 255, 255) | — |
| (2, 2) | 0 | (0, 0, 0) | — | (6, 2) | 0 | (255, 255, 255) | — |
| (2, 3) | 0 | (0, 0, 0) | — | (6, 3) | 0 | (255, 255, 255) | — |
| (2, 4) | 0 | (0, 0, 0) | — | (6, 4) | 0 | (255, 255, 255) | — |
| (2, 5) | 0 | (0, 0, 0) | — | (6, 5) | 0 | (255, 255, 255) | — |
| (2, 6) | 0 | (0, 0, 0) | — | (6, 6) | 0 | (255, 255, 255) | — |
| (2, 7) | 0 | (0, 0, 0) | — | (6, 7) | 0 | (0, 0, 0) | — |
| (3, 0) | 0 | (0, 0, 0) | — | (7, 0) | 0 | (0, 0, 0) | — |
| (3, 1) | 0 | (0, 0, 0) | — | (7, 1) | 0 | (0, 0, 0) | — |
| (3, 2) | 0 | (0, 0, 0) | — | (7, 2) | 0 | (0, 0, 0) | — |
| (3, 3) | 0 | (0, 0, 0) | — | (7, 3) | 0 | (0, 0, 0) | — |
| (3, 4) | 0 | (0, 0, 0) | — | (7, 4) | 0 | (0, 0, 0) | — |
| (3, 5) | 0 | (0, 0, 0) | — | (7, 5) | 0 | (0, 0, 0) | — |
| (3, 6) | 0 | (0, 0, 0) | — | (7, 6) | 0 | (0, 0, 0) | — |
| (3, 7) | 0 | (0, 0, 0) | — | (7, 7) | 0 | (0, 0, 0) | — |

FIG. 17

| COORDINATES (X, Y) | FLAG | COLOR VALUE | | COORDINATES (X, Y) | FLAG | COLOR VALUE | |
|---|---|---|---|---|---|---|---|
| | | FIRST COLOR | SECOND COLOR | | | FIRST COLOR | SECOND COLOR |
| (0, 0) | 0 | (0, 0, 0) | — | (4, 0) | 0 | (0, 0, 0) | — |
| (0, 1) | 0 | (0, 0, 0) | — | (4, 1) | 0 | (255, 255, 255) | — |
| (0, 2) | 0 | (0, 0, 0) | — | (4, 2) | 0 | (255, 255, 255) | — |
| (0, 3) | 0 | (0, 0, 0) | — | (4, 3) | 0 | (255, 255, 255) | — |
| (0, 4) | 0 | (0, 0, 0) | — | (4, 4) | 0 | (255, 255, 255) | — |
| (0, 5) | 0 | (0, 0, 0) | — | (4, 5) | 0 | (255, 255, 255) | — |
| (0, 6) | 0 | (0, 0, 0) | — | (4, 6) | 0 | (255, 255, 255) | — |
| (0, 7) | 0 | (0, 0, 0) | — | (4, 7) | 0 | (0, 0, 0) | — |
| (1, 0) | 0 | (0, 0, 0) | — | (5, 0) | 0 | (0, 0, 0) | — |
| (1, 1) | 0 | (0, 0, 0) | — | (5, 1) | 0 | (255, 255, 255) | — |
| (1, 2) | 0 | (0, 0, 0) | — | (5, 2) | 0 | (255, 255, 255) | — |
| (1, 3) | 0 | (0, 0, 0) | — | (5, 3) | 0 | (255, 255, 255) | — |
| (1, 4) | 0 | (0, 0, 0) | — | (5, 4) | 0 | (255, 255, 255) | — |
| (1, 5) | 0 | (0, 0, 0) | — | (5, 5) | 0 | (255, 255, 255) | — |
| (1, 6) | 0 | (0, 0, 0) | — | (5, 6) | 0 | (255, 255, 255) | — |
| (1, 7) | 0 | (0, 0, 0) | — | (5, 7) | 0 | (0, 0, 0) | — |
| (2, 0) | 0 | (0, 0, 0) | — | (6, 0) | 0 | (0, 0, 0) | — |
| (2, 1) | 0 | (0, 0, 0) | — | (6, 1) | 1 | (255, 255, 255) | (0, 0, 0) |
| (2, 2) | 0 | (0, 0, 0) | — | (6, 2) | 1 | (255, 255, 255) | (0, 0, 0) |
| (2, 3) | 0 | (0, 0, 0) | — | (6, 3) | 1 | (255, 255, 255) | (0, 0, 0) |
| (2, 4) | 0 | (0, 0, 0) | — | (6, 4) | 1 | (255, 255, 255) | (0, 0, 0) |
| (2, 5) | 0 | (0, 0, 0) | — | (6, 5) | 1 | (255, 255, 255) | (0, 0, 0) |
| (2, 6) | 0 | (0, 0, 0) | — | (6, 6) | 1 | (255, 255, 255) | (0, 0, 0) |
| (2, 7) | 0 | (0, 0, 0) | — | (6, 7) | 0 | (0, 0, 0) | — |
| (3, 0) | 0 | (0, 0, 0) | — | (7, 0) | 0 | (0, 0, 0) | — |
| (3, 1) | 0 | (0, 0, 0) | — | (7, 1) | 0 | (0, 0, 0) | — |
| (3, 2) | 0 | (0, 0, 0) | — | (7, 2) | 0 | (0, 0, 0) | — |
| (3, 3) | 0 | (0, 0, 0) | — | (7, 3) | 0 | (0, 0, 0) | — |
| (3, 4) | 0 | (0, 0, 0) | — | (7, 4) | 0 | (0, 0, 0) | — |
| (3, 5) | 0 | (0, 0, 0) | — | (7, 5) | 0 | (0, 0, 0) | — |
| (3, 6) | 0 | (0, 0, 0) | — | (7, 6) | 0 | (0, 0, 0) | — |
| (3, 7) | 0 | (0, 0, 0) | — | (7, 7) | 0 | (0, 0, 0) | — |

FIG. 18

| COORDINATES (X, Y) | FLAG | COLOR VALUE FIRST COLOR | COLOR VALUE SECOND COLOR | COORDINATES (X, Y) | FLAG | COLOR VALUE FIRST COLOR | COLOR VALUE SECOND COLOR |
|---|---|---|---|---|---|---|---|
| (0, 0) | 0 | (0, 0, 0) | - | (4, 0) | 0 | (0, 0, 0) | - |
| (0, 1) | 0 | (0, 0, 0) | - | (4, 1) | 0 | (255, 255, 255) | - |
| (0, 2) | 0 | (0, 0, 0) | - | (4, 2) | 0 | (255, 255, 255) | - |
| (0, 3) | 0 | (0, 0, 0) | - | (4, 3) | 0 | (255, 255, 255) | - |
| (0, 4) | 0 | (0, 0, 0) | - | (4, 4) | 0 | (255, 255, 255) | - |
| (0, 5) | 0 | (0, 0, 0) | - | (4, 5) | 0 | (255, 255, 255) | - |
| (0, 6) | 0 | (0, 0, 0) | - | (4, 6) | 0 | (255, 255, 255) | - |
| (0, 7) | 0 | (0, 0, 0) | - | (4, 7) | 0 | (0, 0, 0) | - |
| (1, 0) | 0 | (0, 0, 0) | - | (5, 0) | 0 | (0, 0, 0) | - |
| (1, 1) | 0 | (0, 0, 0) | - | (5, 1) | 0 | (255, 255, 255) | - |
| (1, 2) | 0 | (0, 0, 0) | - | (5, 2) | 0 | (255, 255, 255) | - |
| (1, 3) | 0 | (0, 0, 0) | - | (5, 3) | 0 | (255, 255, 255) | - |
| (1, 4) | 0 | (0, 0, 0) | - | (5, 4) | 0 | (255, 255, 255) | - |
| (1, 5) | 0 | (0, 0, 0) | - | (5, 5) | 0 | (255, 255, 255) | - |
| (1, 6) | 0 | (0, 0, 0) | - | (5, 6) | 0 | (255, 255, 255) | - |
| (1, 7) | 0 | (0, 0, 0) | - | (5, 7) | 0 | (0, 0, 0) | - |
| (2, 0) | 0 | (0, 0, 0) | - | (6, 0) | 0 | (0, 0, 0) | - |
| (2, 1) | 0 | (0, 0, 0) | - | (6, 1) | 7 | (127, 127, 127) | (255, 255, 255) |
| (2, 2) | 0 | (0, 0, 0) | - | (6, 2) | 7 | (127, 127, 127) | (255, 255, 255) |
| (2, 3) | 0 | (0, 0, 0) | - | (6, 3) | 7 | (127, 127, 127) | (255, 255, 255) |
| (2, 4) | 0 | (0, 0, 0) | - | (6, 4) | 7 | (127, 127, 127) | (255, 255, 255) |
| (2, 5) | 0 | (0, 0, 0) | - | (6, 5) | 7 | (127, 127, 127) | (255, 255, 255) |
| (2, 6) | 0 | (0, 0, 0) | - | (6, 6) | 7 | (127, 127, 127) | (255, 255, 255) |
| (2, 7) | 0 | (0, 0, 0) | - | (6, 7) | 0 | (0, 0, 0) | - |
| (3, 0) | 0 | (0, 0, 0) | - | (7, 0) | 0 | (0, 0, 0) | - |
| (3, 1) | 0 | (0, 0, 0) | - | (7, 1) | 0 | (0, 0, 0) | - |
| (3, 2) | 0 | (0, 0, 0) | - | (7, 2) | 0 | (0, 0, 0) | - |
| (3, 3) | 0 | (0, 0, 0) | - | (7, 3) | 0 | (0, 0, 0) | - |
| (3, 4) | 0 | (0, 0, 0) | - | (7, 4) | 0 | (0, 0, 0) | - |
| (3, 5) | 0 | (0, 0, 0) | - | (7, 5) | 0 | (0, 0, 0) | - |
| (3, 6) | 0 | (0, 0, 0) | - | (7, 6) | 0 | (0, 0, 0) | - |
| (3, 7) | 0 | (0, 0, 0) | - | (7, 7) | 0 | (0, 0, 0) | - |

IMAGE PROCESSING APPARATUS, CONTROL METHOD AND COMPUTER-READABLE MEDIUM

BACKGROUND OF THE INVENTION

1. Field of the Invention

The present invention relates to an image processing apparatus which executes image processing of encoded data that is obtained by compressing an image into units of predetermined blocks, a control method, and a computer-readable medium.

2. Description of the Related Art

In recent years, there has been a high demand for high-resolution color images. In order to meet demands to enhance the image quality of such color images, a digital multifunction peripheral (MFP) frequently handles images having a resolution of 1200 dpi (dots per inch) or higher. In image processing apparatuses (a digital camera and facsimile apparatus) which handle these images in addition to the digital MFP, in order to save memory/hard disk amounts and to shorten write time periods in them, color image data is compressed to attain a cost reduction and high-speed processing.

Conventionally, as a compression method of a color still image, a JPEG method using discrete cosine transformation and a method using Wavelet transformation are popularly used. An encoding method of this type generally encodes an image into units of predetermined blocks (for example, 8×8 or 16×16 pixels), and discrete cosine transformation, quantization, and entropy encoding are applied to the encoded data, thus obtaining a high compression efficiency. Since the encoding method of this type is a variable length encoding method, the code size changes for each image to be encoded.

As the resolution becomes higher, the number of pixels that require image processing increases dramatically, thus increasing its processing load. For example, when the resolution doubles from 600 dpi to 1200 dpi, the number of pixels to be processed increases four times. When the aforementioned image compression is used, in order to refer to and convert that pixel data, decoding processing of compressed data is required. For this reason, processing has to be applied to all pixels of high-resolution data for each pixel, resulting in a long processing time.

As a technique for executing compression processing of pixel data, for example, a known runlength compression method which stores pixel data and its runlength, and a technique for compressing pixel data by detecting an edge for each block, and storing two colors included in that edge (Japanese Patent Laid-Open No. 10-257488) have been disclosed. As a technique for applying image processing to compressed data without any decoding processing, a technique for setting DCT coefficients of, for example, MPEG image data other than a DC component to be zero so as to fill each block by one certain color (Japanese Patent Laid-Open No. 10-290391) has been disclosed.

An electrophotography printer takes a measure against a tailing-blur phenomenon caused by scattered toners on the downstream side of a convey direction of a print sheet due to explosion and scattering of toners at the time of fixing. A conventional printer executes, as a measure against this tailing-blur phenomenon, image processing for detecting a line defined by successive pixels in a main scan direction in an image, and thinning out pixels which belong to a line lower part (downstream side on a print sheet). The high resolution processing of the tailing-blur phenomenon measure is requested as well as other image processing. In order to suppress an increase in memory use amount and a decrease in processing speed while executing resolution enhancement in the tailing-blur measure, image processing is required to be applied to compressed data itself. However, in the related art, image processing cannot be applied to compressed data itself in processing that requires to change an image processing method depending on a target image feature (a line or not) like in the tailing-blur measure.

SUMMARY OF THE INVENTION

According to one aspect of the present invention, there is provided an image processing apparatus which applies processing to image data encoded by an encoding method that encodes image data by holding, for each block including the predetermined number of pixels, color information and color layout information included in that block, the apparatus comprising: a detection unit configured to detect a region including successive pixels having identical color information, the number of pixels of which is larger than a predetermined value, using the color information and the color layout information in the encoded image data; and a conversion unit configured to convert color information of a pixel corresponding to a predetermined position in the region, and layout information of a block including the pixel at the predetermined position, of a plurality of blocks including the region detected by the detection unit.

According to another aspect of the present invention, there is provided a control method of an image processing apparatus which applies processing to image data encoded by an encoding method that encodes image data by holding, for each block including the predetermined number of pixels, color information and color layout information included in that block, the method comprising: a detection step of controlling a detection unit to detect a region including successive pixels having identical color information, the number of pixels of which is larger than a predetermined value, using the color information and the color layout information in the encoded image data; and a conversion step of controlling a conversion unit to convert color information of a pixel corresponding to a predetermined position in the region, and layout information of a block including the pixel at the predetermined position, of a plurality of blocks including the region detected in the detection step.

According to another aspect of the present invention, there is provided a computer-readable medium storing a program, the program controlling a computer to function as: a detection unit configured to detect, using color information and color layout information in image data encoded by an encoding method that encodes image data by holding, for each block including the predetermined number of pixels, color information and color layout information included in that block, a region including successive pixels having identical color information, the number of pixels of which is larger than a predetermined value; and a conversion unit configured to convert color information of a pixel corresponding to a predetermined position in the region, and layout information of a block including the pixel at the predetermined position, of a plurality of blocks including the region detected by the detection unit.

According to the present invention, tailing-blur measure processing can be executed without expanding compressed data. Thus, the memory size and memory bus bands can be saved. Also, the processing load on the tailing-blur measure processing can be reduced.

Further features of the present invention will become apparent from the following description of exemplary embodiments (with reference to the attached drawings).

BRIEF DESCRIPTION OF THE DRAWINGS

FIG. 13 is a flowchart showing tailing-blur measure processing according to the second embodiment;

FIG. 16 is a table showing an example of code data according to the first and second embodiments;

FIG. 17 is a table showing an example of code data according to the first embodiment; and FIG. 18 is a table showing an example of code data according to the second embodiment.

DESCRIPTION OF THE EMBODIMENTS

First Embodiment

[System Arrangement]

Figure 1:
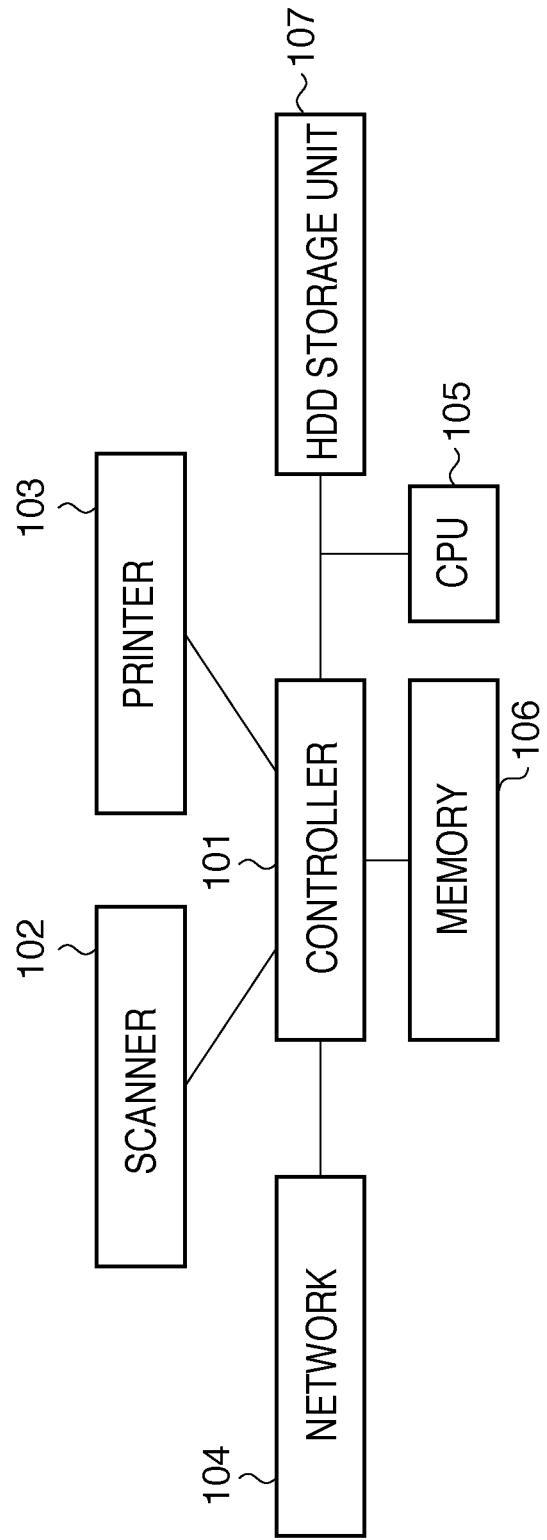
FIG. 1 is a block diagram showing an overview of an MFP system.

Embodiments of the present invention will be described hereinafter with reference to the drawings. FIG. 1 is a block diagram showing the overall arrangement of a digital multi-function peripheral system (to be referred to as an MFP hereinafter) which executes scan, print, and copy processes according to an embodiment of the present invention. A controller 101 is connected to a scanner 102 as an image input device, a printer 103 as an image output device, and a network 104 such as a LAN or public network (WAN). The MFP inputs and outputs image information and device information, and expands PDL data into an image.

A CPU 105 is a processor which controls the overall system. A memory 106 is a system work memory required for the operation of the CPU 105, and is also an image memory used to temporarily store image data. An HDD storage unit 107 is a hard disk drive, and stores system software and image data.

Figure 2:
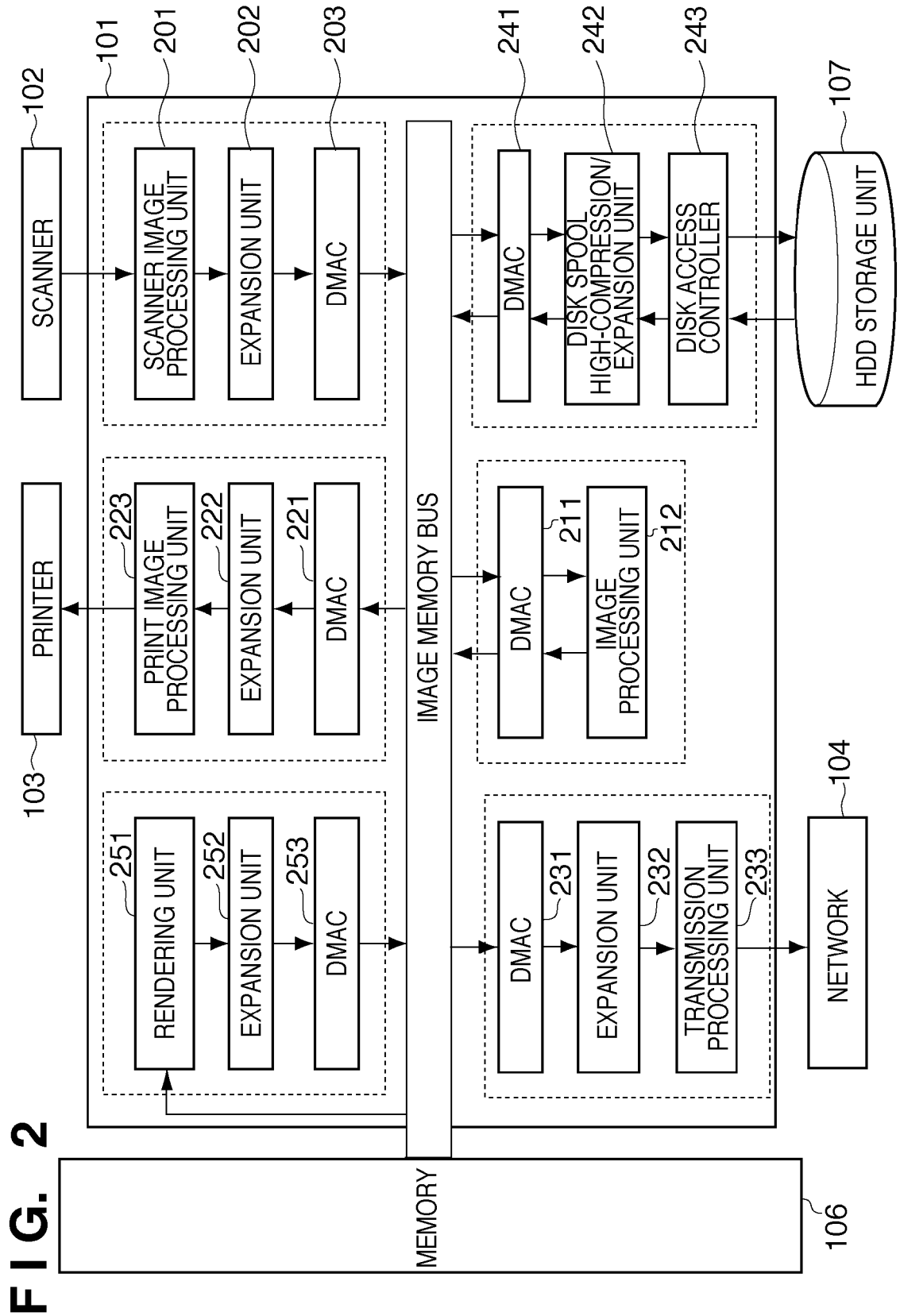
FIG. 2 is a block diagram showing an overview of a controller.

The operation of the controller 101 shown in FIG. 1 will be described in detail below with reference to FIG. 2. A case will be explained wherein scan data is loaded. In the controller 101 which received R, G, and B (RED, GREEN, and BLUE) scanned image data of three colors from the scanner 102, a scanner image processing unit 201 applies image processing such as shading processing and filter processing to these image data. A compression unit 202 applies image compression processing to the data which have undergone the image processing. The compressed image data are stored in the memory 106 via a DMAC (DIRECT MEMORY ACCESS CONTROLLER) 203.

Upon printing scan data, compressed data stored in the memory 106 are input to an image processing unit 212 via a DMAC 211, and are converted onto a CMYK (CYAN, MAGENTA, YELLOW, and BLACK) color space. After that, these C, M, Y, and K values undergo color processing for adjustment such as density adjustment and printer gamma correction, and the processed values are stored again in the memory 106 via the DMAC 211. After that, in order to apply image processing for printing, compressed data stored in the memory 106 are loaded via a DMAC 221, and are expanded to raster image data by an expansion unit 222. The raster C, M, Y, and K image data are input to a print image processing unit 223, undergo area gradation processing by method of dithering or error diffusion, and are then output to the printer 103.

Upon transmitting scan data onto a network, compressed data stored in the memory 106 are input to the image processing unit 212 via the DMAC 211 and undergo color conversion. More specifically, the input data undergo, for example, display gamma adjustment and paper background color adjustment, and are converted onto a YCbCr (luminance, BLUE color difference, and RED color difference) color space. After that, the converted values are stored in the memory 106 via the DMAC 211 again. In order to apply image processing for transmission, compressed data stored in the memory 106 are loaded via a DMAC 231, and are expanded to raster image data by an expansion unit 232. A transmission processing unit 233 applies JPEG compression processing to raster Y, Cb, and Cr image data in case of color image transmission, or binarizes Y data and applies, for example, JBIG compression to the Y data in case of monochrome binary image transmission. The compressed data are output onto the network 104.

Upon saving scan data, compressed data stored in the memory 106 are input to a disk spool high-compression/expansion unit 242 via a DMAC 241. The disk spool high-compression/expansion unit 242 applies JPEG compression with a higher compression ratio to the input data since an HDD write speed is lower than that to the memory. After that, the compressed data are saved in the HDD storage unit 107 via a disk access controller 243.

When saved data are to be expanded onto the memory again, processing opposite to that described above is executed. A case will be explained below wherein PDL data is written in the memory. Although not shown in FIG. 2, PDL data sent from the network 104 in FIG. 1 is interpreted by the CPU 105, which converts that data into a display list, and outputs it to the memory 106. After that, the display list stored in the memory 106 is rendered to raster RGB image data by a rendering unit 251, and these image data then undergo image compression processing by a compression unit 252. The compressed data are stored in the memory 106 via a DMAC 253. The print processing, transmission processing onto the network, and saving processing of the PDL image data can be implemented by executing the same processes as the scan data.

[Compression Processing]

Details of the compression unit of raster image data as a characteristic feature of this embodiment will be described below. A block of 2×2 pixels is extracted from a raster image for each page, and data for that block is compressed. Prior to a description of processing, the number of combinations according to the number of colors in four (=2×2) pixel data will be examined. Since the number of pixels is four, the number of colors in these pixel data is a maximum of four, and there are combinations of one to four colors at most in a block. The numbers of combinations that these patterns of four colors can assume will be explained below with reference to FIG. 3.

When a block includes one color, since four pixels are configured by the same color, only one combination is available. A case will be examined below wherein a block includes two colors. As for the number of combinations when two colors are laid out in four pixels, assuming that the color of an upper left pixel is a first color, and that of another pixel is a second color, since the first or second color is set in the remaining three pixels other than the upper left pixels, a total of seven different combinations are available except for a case in which four pixels have the same color. A case will be examined below wherein a block includes three colors. The number of combinations when three colors are laid out in four pixels can be also the number of combinations when only one of three colors is used twice, and the number of combinations when two pixels of the coordinate positions of four pixels have the same color. That is, the number of combinations for three colors is that of combinations which assume two out of four coordinate positions, and a total of six different combinations are available. Finally, when a block includes four colors, only one pattern is available as in the case of one color.

Figure 4:
FIG. 4 is a view which enumerates block patterns and their identifiers.
Figure 4:
Figure 4:
Figure 4:
Figure 4:
Figure 4:
Figure 4:
Figure 4:
Figure 4:
Figure 4:
Figure 4:
Figure 4:
Figure 4:
Figure 4:
Figure 4:

By summing up the numbers of patterns for one to four colors, a total of 15 different patterns are available. When a flag is assigned to identify all these patterns, 4 bits are required as a data size, as shown in FIG. 4, and the flag indicating this layout information will be referred to as a pattern flag hereinafter.

Figure 3:
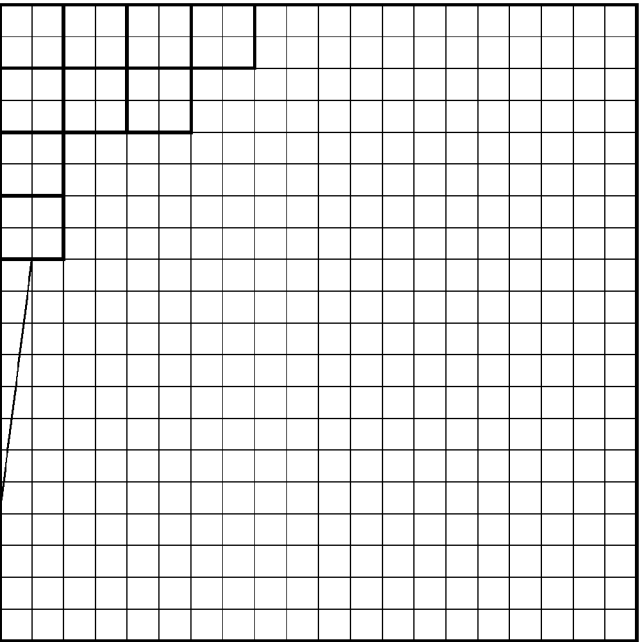
FIG. 3 is a view which enumerates block patterns upon dividing an image into blocks.
Figure 3:
Figure 3:
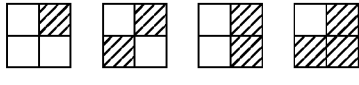
Figure 3:
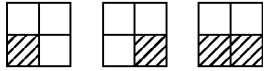
Figure 3:
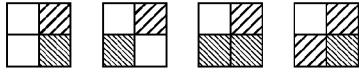
Figure 5:
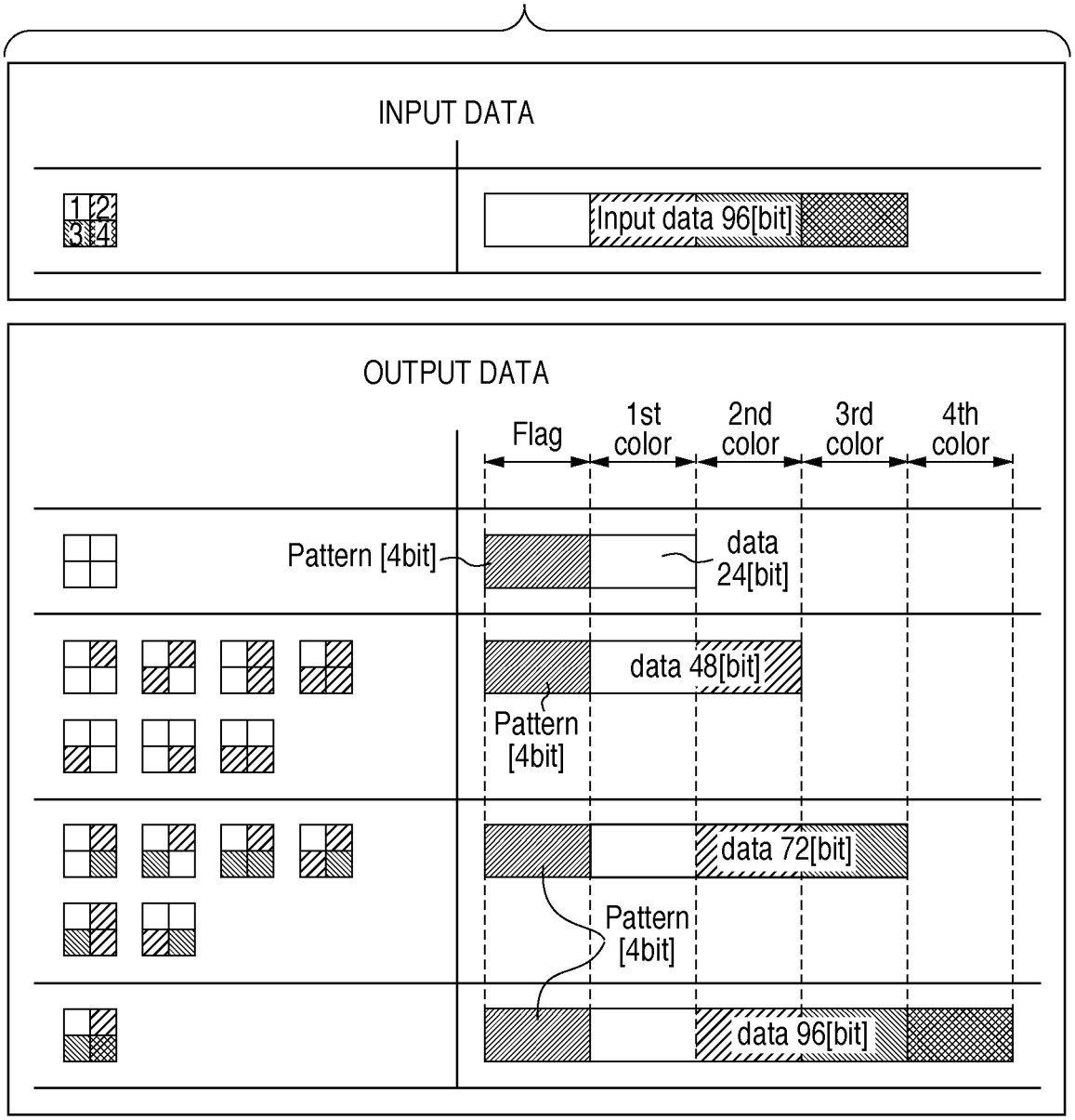
FIG. 5 is a view showing the input/output relationship with respect to compression processing according to the first embodiment.

FIG. 5 shows the relationship between input and output data of a block of 2×2 pixels. As shown in FIG. 3, a data size as output data after compression varies depending on the number of colors included in a block. When a block is configured by one color, a pattern flag (4 bits) and color information for one color (R, G, and B 8-bit data) require a data size of 28 bits. When a block is configured by four colors, a pattern flag (4 bits) and four pieces of color information for four colors (R, G, and B 8-bit data×4) require a data size of 100 bits.

Figure 6:
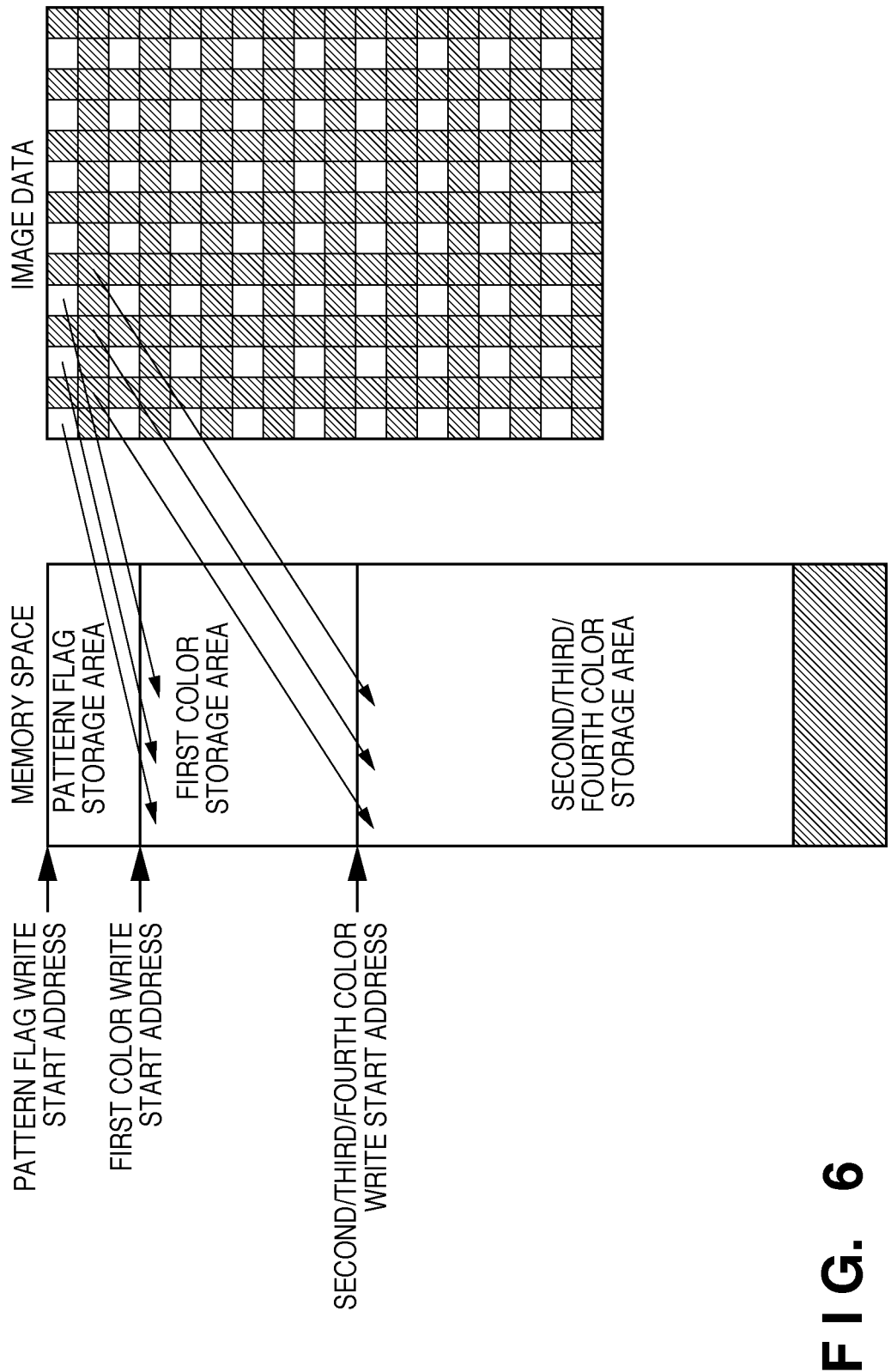
FIG. 6 is a view showing a layout of compressed data on a memory space.

FIG. 6 shows the configuration on a memory space when compressed data are stored. On the memory space, compressed data are stored while being classified into their types. The types in this case include a pattern flag, the first color in a block, and colors (second, third, and fourth colors) other than the first color in the block. Note that the first color indicates values (R, G, and B) of a pixel located at a predetermined position in a block, and indicates values of an upper left pixel in the block in this case. When data are held, as shown in FIG. 6, values and layout information of each pixel can be acquired even in a compressed state.

[Tailing-blur Measure Processing]

The tailing-blur measure processing sequence executed by the image processing unit 212 will be explained below in consideration of combinations that 2×2 pixels can assume, as described above. The following description will be given under the assumption that each of R, G, and B data is input as 8 bits to have 256 gradation levels, and data is dot sequential 8-bit data, that is, one pixel is expressed by 24-bit data. In case of raster image data shown in FIG. 15A, compressed data correspond to code data shown in FIG. 16. Upper left 4×4 pixels have coordinates (0, 0), and 4×4 pixels below these pixels have coordinates (1, 0). Also, this processing sequence is implemented when the CPU 105 reads out and executes a program stored in, for example, the memory 106.

Figure 7:
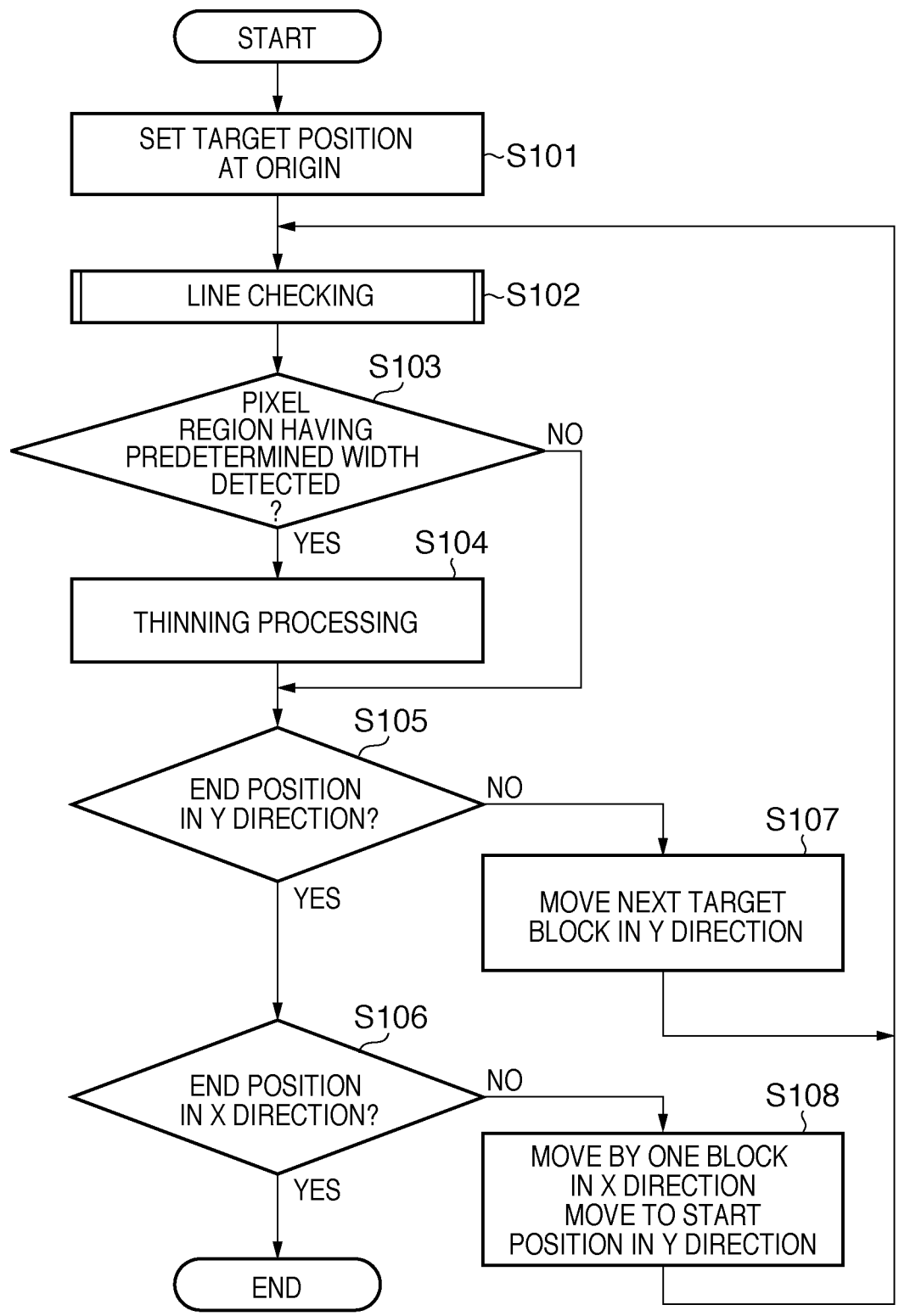
FIG. 7 is a flowchart showing tailing-blur measure processing according to the first embodiment.

FIG. 7 is a flowchart showing the tailing-blur measure processing according to the first embodiment. The image processing unit 212 sets a target position at an origin (a lower left position in this embodiment; this position is different from a coordinate position in FIG. 16) on raster image data (S101). The image processing unit 212 executes line checking processing of a 2×2 pixel block located at the target position (S102). In the line checking processing, the image processing unit 212 counts a width in an up-and-down direction as a direction to be scanned, and checks whether or not to detect a region which has a predetermined width and includes successive pixels having identical values (S103). In this case, the tailing-blur measure processing is executed while defining a region larger than a block size as a predetermined width. The predetermined width is defined by three or four pixels. That is, when a counter value is 3 or 4, the image processing unit 212 judges that a pixel region which includes a plurality of pixels and has the predetermined width is detected. The counter will be described in the line checking processing to be described later. If it is judged that a pixel region having the predetermined width is detected (YES in step S103), the image processing unit 212 applies thinning processing to a pixel which is located at a second pixel position from the lower end and at a second pixel position from the left end of that region (S104).

Figure 15A:
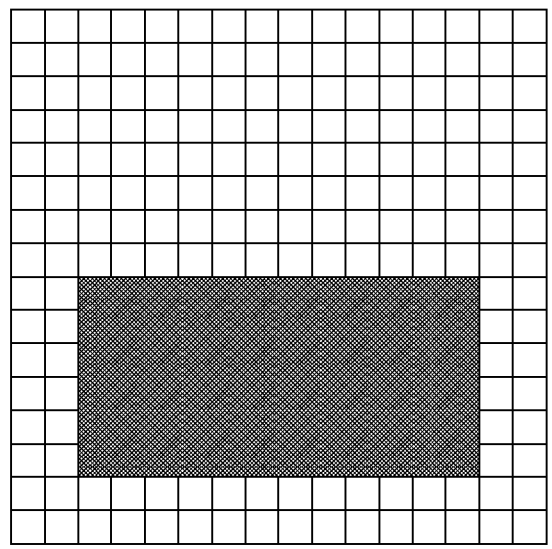
FIGS. 15A, 15B, and 15C are views showing an example of input and output image data according to the first and second embodiments.
Figure 15B:
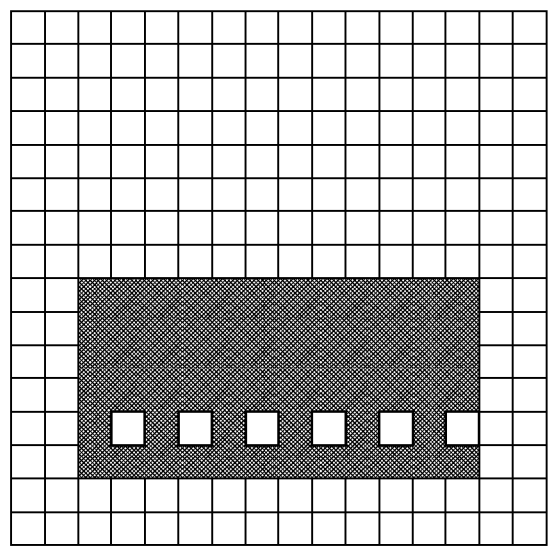

After the line checking processing and thinning processing, if the target position does not reach the end position in the Y direction (the upper end of image data) (NO in step S105), the image processing unit 212 moves the target position upward by one block (S107), and the process returns to step S102 to execute the next line checking processing. If the target position reaches the upper end (YES in step S105), the image processing unit 212 checks whether or not the target position reaches the end position in the X direction (the right end of image data) (S106). If the target position does not reach the right end (NO in step S106), the CPU 105 moves the target position to the right by one block (S108), and the process returns to step S102 to execute the next line checking processing. If the target position reaches the right end (YES in step S106), the CPU 105 ends the tailing-blur measure processing. With this tailing-blur measure processing, when raster image data shown in FIG. 15A is input, raster image data shown in FIG. 15B is output. FIG. 17 shows code data corresponding to FIG. 15B. The processing contents will be described in more detail below.

[Line Checking Processing]

Figure 8:
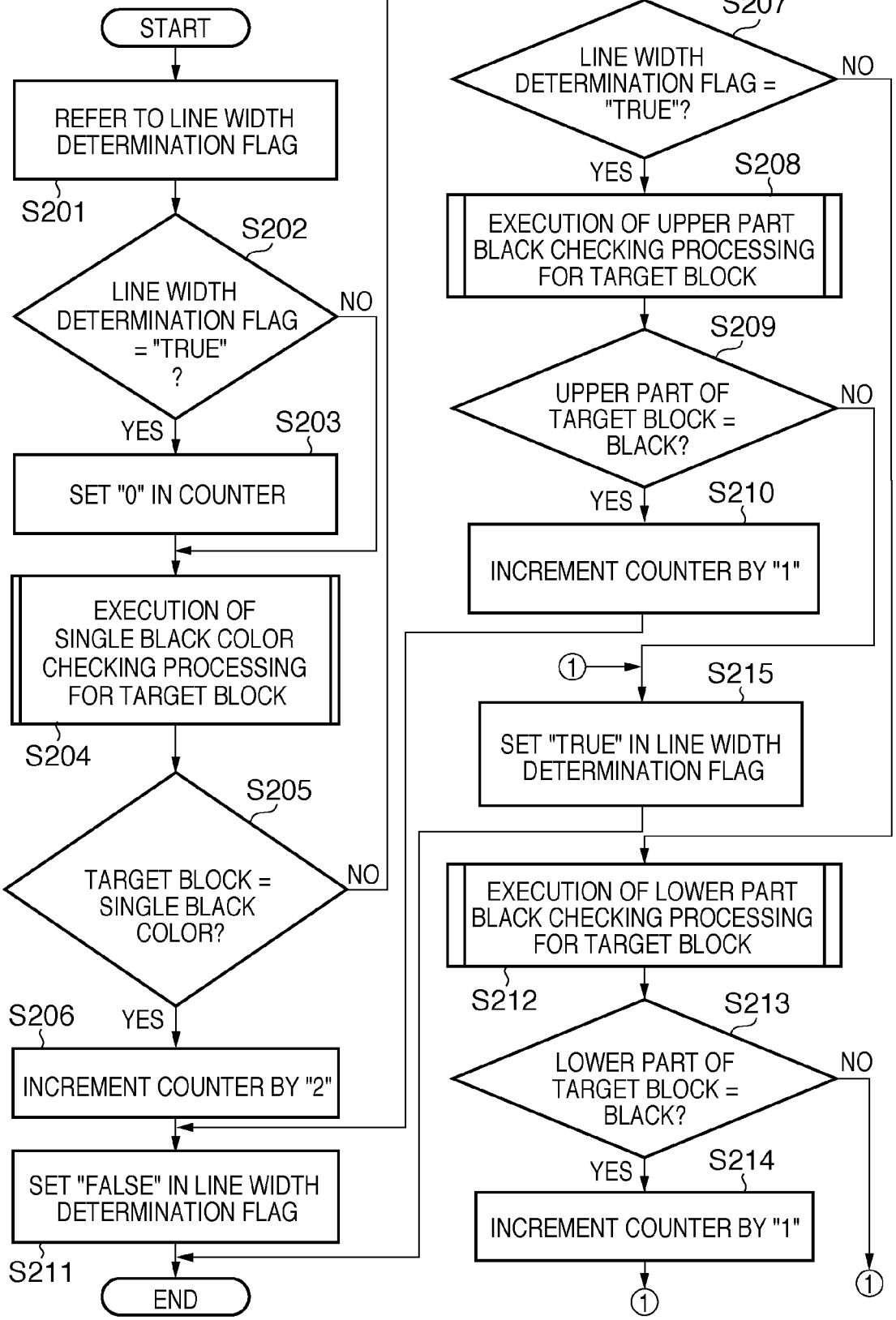
FIG. 8 is a flowchart showing line checking processing according to the first and second embodiments.

FIG. 8 is a flowchart showing the line checking processing according to this embodiment. In this case, as a line, a rectangle of a region including successive pixels having identical pixel values is detected. The line checking processing is executed by the image processing unit 212. In the line checking processing, a line width determination flag indicating that the width of a line is determined, and a counter used to count the width of a line are assured on the memory 106. The line width determination flag has "FALSE" as an initial value, and is reset to "FALSE" every time the target position of a block is moved to the right. The counter is set to have "0" as an initial value, and is reset to "0" every time the target position of a block is moved to the right. In this case, the counter indicates the number of successive pixels having identical pixel values. In this embodiment, sequential processing is executed from the lower end toward the upper end. In order to simplify processing, a block in which two right pixels at the left end of the successive region have identical pixel values (pattern flag="3", "4", or "C"), and a block in which left two pixels at the right end have identical pixel values (pattern flag="3", "6", or "8") are not selected as a width detection target. However, in consideration of a direction of processing for a block, the blocks having the aforementioned pattern flags may be handled as those for which the width is checked.

When the line checking processing starts, the image processing unit 212 refers to the line width determination flag (S201). If this value is "TRUE" (YES in step S202), the image processing unit 212 sets "0" in the counter (S203). Next, the image processing unit 212 executes single black color checking processing for checking whether or not a target block is configured by a single black color (S204). If it is judged in this single black color checking processing that the target block is configured by a single black color (YES in step S205), the image processing unit 212 increments the counter by "2" (S206). If it is judged that the target block is not configured by a single black color (NO in step S205), and if the line width determination flag is "TRUE" (YES in step S207), the image processing unit 212 executes upper part black checking processing for checking whether or not an upper part of the target block is black (S208). If it is judged that the upper part of the target block is black (YES in step S209), the image processing unit 212 increments the counter by "1" (S210). If the target block is configured by a single black color or if the upper part of the target block is black (that is, after the process in step S206 or S210), the image processing unit 212 sets "FALSE" in the line width determination flag (S211). Then, the image processing unit 212 ends this processing sequence.

If it is judged that the target block is not configured by a single black color (NO in step S205), and if the line width determination flag is "FALSE" (NO in step S207), the image processing unit 212 executes lower part black determination processing for checking if a lower part of the target block is black (S212). If it is judged that the lower part of the target block is black (YES in step S213), the image processing unit 212 increments the counter by "1" (S214). If the target block is not configured by a single black color (NO in step S205), and if the upper part of the target block is not black (NO in step S209), the image processing unit 212 sets "TRUE" in the line width determination flag (S215). Likewise, after NO is judged in step S213 or the process in step S214, the image processing unit 212 sets "TRUE" in the line width determination flag (S215). After that, the image processing unit 212 ends this processing sequence. As described above, the line checking processing refers to code data of a 2×2 pixel block and updates the line width determination flag and counter.

[Single Black Color Checking Processing]

Figure 9:
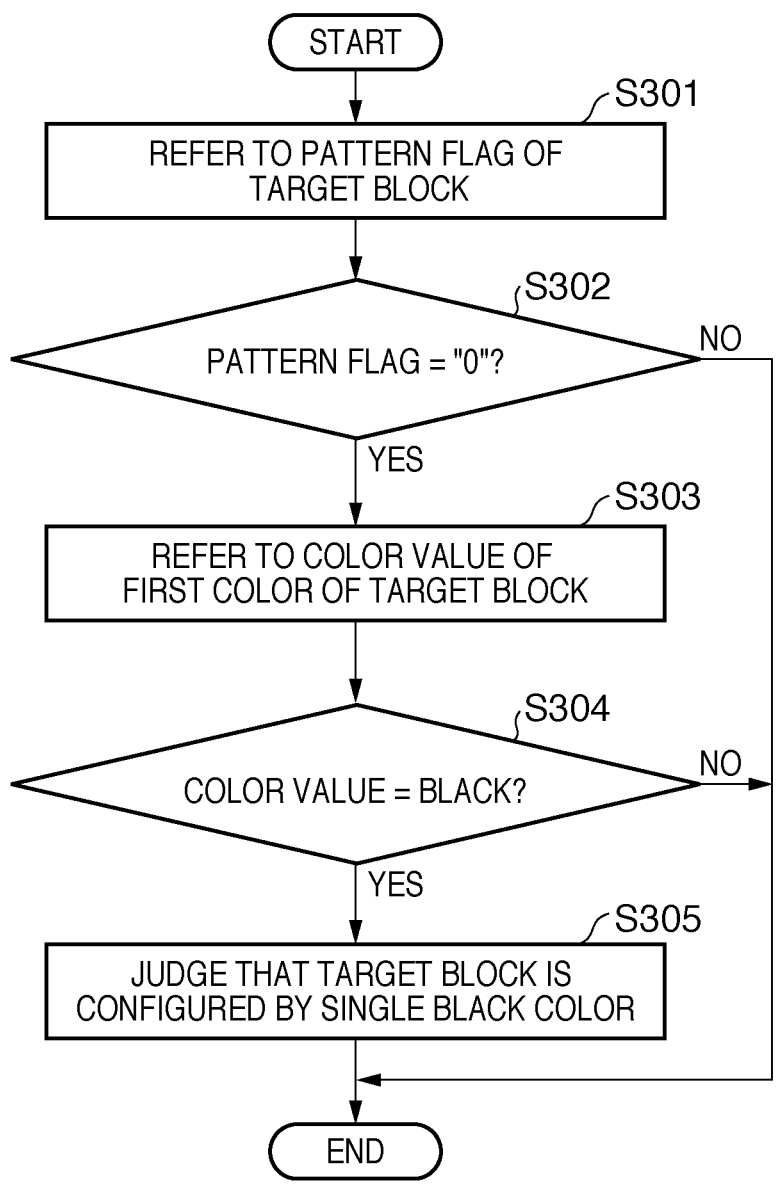
FIG. 9 is a flowchart showing checking processing of the configuration of a target block according to the first and second embodiments.

FIG. 9 is a flowchart showing the processing for checking whether or not a target block is configured by a single black color according to this embodiment. The single black color checking processing is executed by the image processing unit 212. When the single black color checking processing starts, the image processing unit 212 refers to a pattern flag of the target block (S301). If the value of the pattern flag is "0" (YES in step S302), the image processing unit 212 refers to a color value of the first color of the target block (S303). If the color value of the first color of the target block is black (YES in step S304), the image processing unit 212 judges that the target block is configured by a single black color (S305). If the pattern flag is not "0" (NO in step S302), or if the color value is not black (NO in step S304), the image processing unit 212 judges that the target black is not configured by a single black color, and ends this processing sequence. As described above, the single black color checking processing checks whether or not a 2×2 pixel block is configured by a single black color.

[Upper Part Black Checking Processing]

Figure 10:
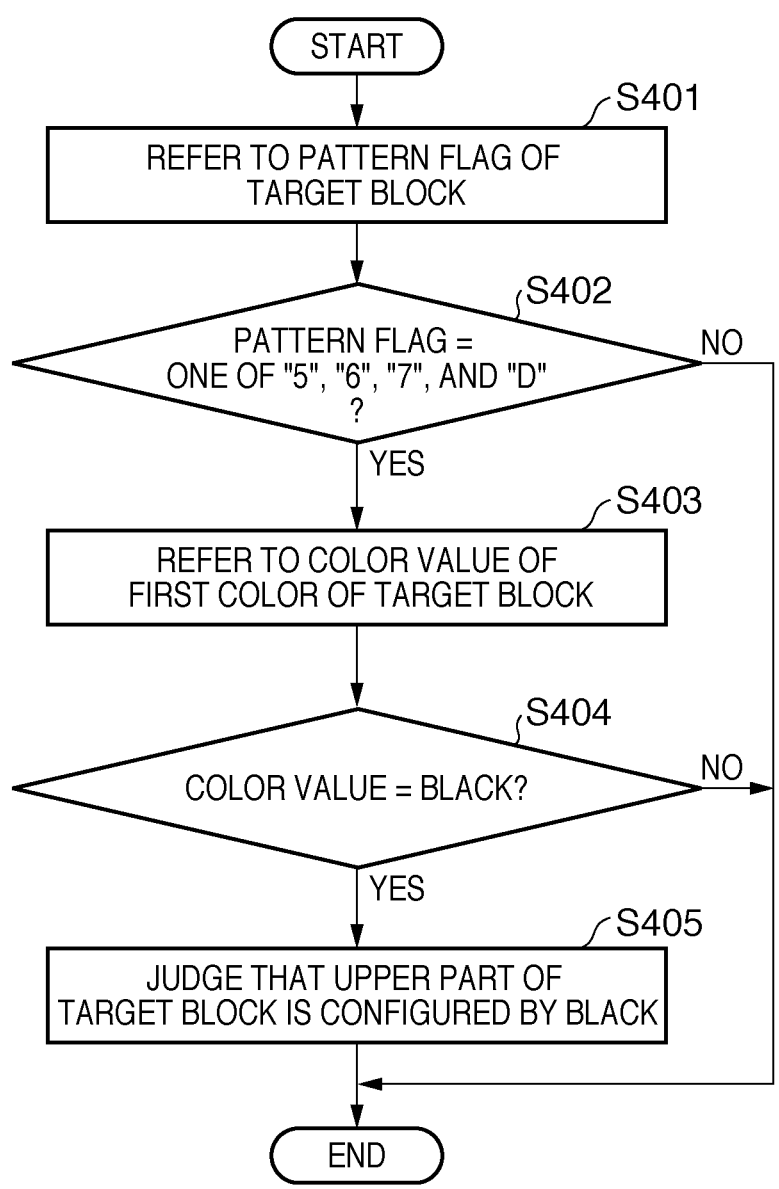
FIG. 10 is a flowchart showing upper part black checking processing of a target block according to the first and second embodiments.

FIG. 10 is a flowchart showing first processing for checking whether or not an upper part of a target block is configured by black according to this embodiment. The upper part black checking processing is executed by the image processing unit 212. When the upper part black checking processing starts, the image processing unit 212 refers to a pattern flag of the target block (S401). If the value of the pattern flag is one of "5", "6", "7", and "D" (YES in step S402), the image processing unit 212 refers to a color value of the first color of the target block (S403). If the color value of the first color of the target block is black (YES in step S404), the image processing unit 212 judges that the upper part of the target block is configured by black (S405). If the value of the pattern flag is other than "5", "6", "7", and "D" (NO in step S402) or if the color value is not black (NO in step S404), the image processing unit 212 judges that the upper part of the target block is not black, and ends this processing sequence. As described above, the upper part black checking processing checks whether or not an upper part of a 2×2 pixel block is configured by black.

[Lower Part Black Checking Processing]

Figure 11:
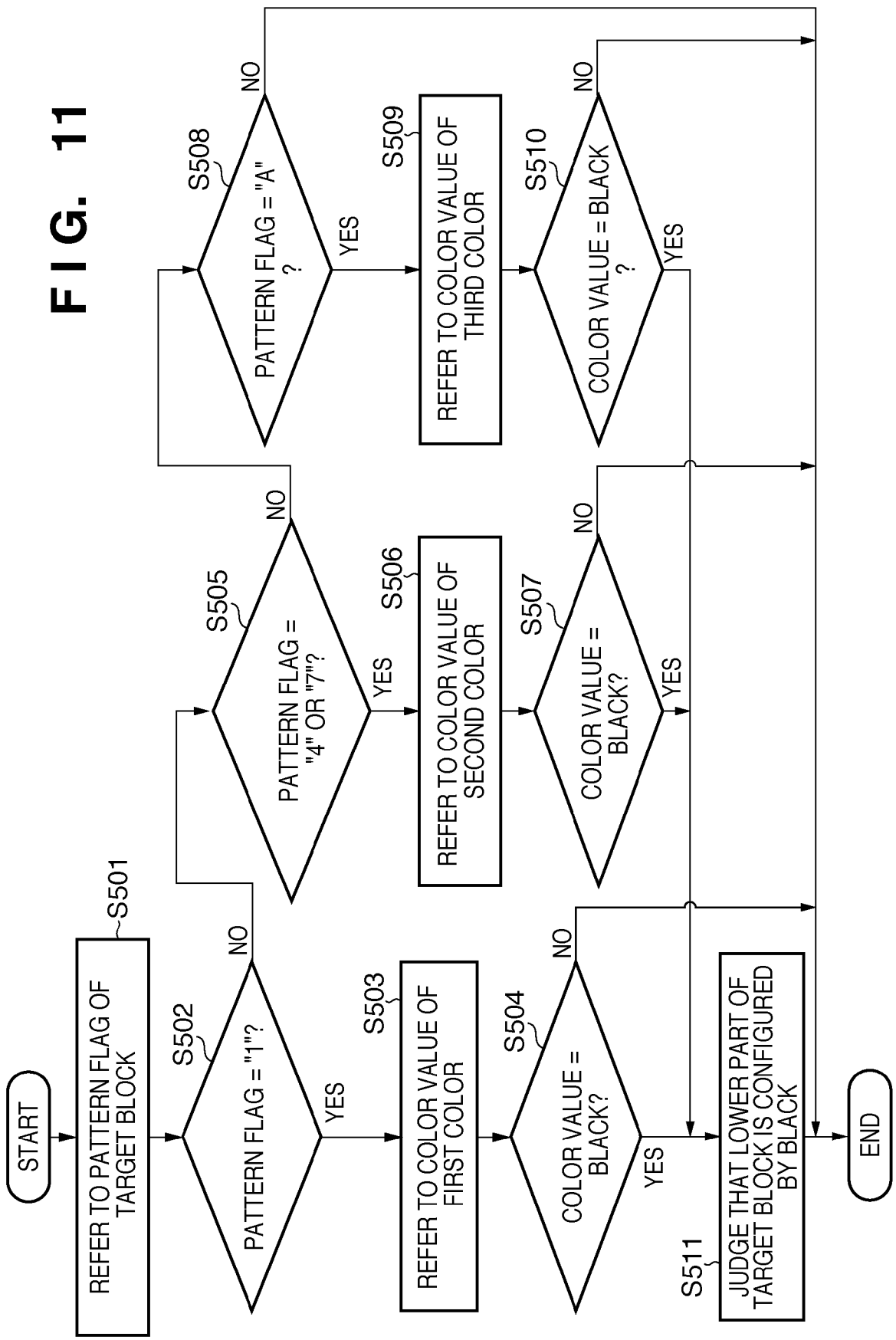
FIG. 11 is a flowchart showing lower part black checking processing of a target block according to the first and second embodiments.

FIG. 11 is a flowchart showing second processing for checking whether or not a lower part of a target block is configured by black according to this embodiment. The lower part black checking processing is executed by the image processing unit 212. When the lower part black checking processing starts, the image processing unit 212 refers to a pattern flag of the target block (S501). If the value of the pattern flag is "1" (YES in step S502), the image processing unit 212 refers to a color value of the first color of the target block (S503). If the color value of the first color of the target block is black (YES in step S504), the image processing unit 212 judges that the lower part of the target block is configured by black (S511). If the pattern flag of the target block is one of "4" and "7" (YES in step S505), the image processing unit 212 refers to a color value of the second color of the target block (S506). If the color value of the second color of the target block is black (YES in step S507), the image processing unit 212 judges that the lower part of the target block is configured by black (S511). Finally, if the pattern flag of the target block is "A" (YES in step S508), the image processing unit 212 refers to a color value of the third color of the target block (S509). If the color value of the third color of the target block is black (YES in step S510), the image processing unit 212 judges that the lower part of the target block is configured by black (S511). If the value of the pattern flag is none of "1", "4", "7", and "A" (NO in step S508), or if the value of the pattern flag is one of "1", "4", "7", and "A", but the values of pixels located in the lower part are not black (NO in one of steps S504, S507, and S510), the image processing unit 212 judges that the lower part is not black. Then, the image processing unit 212 ends this processing sequence. As described above, the lower part black checking processing checks whether or not a lower part of a 2×2 pixel block is configured by black.

[Thinning Processing]

Figure 12:
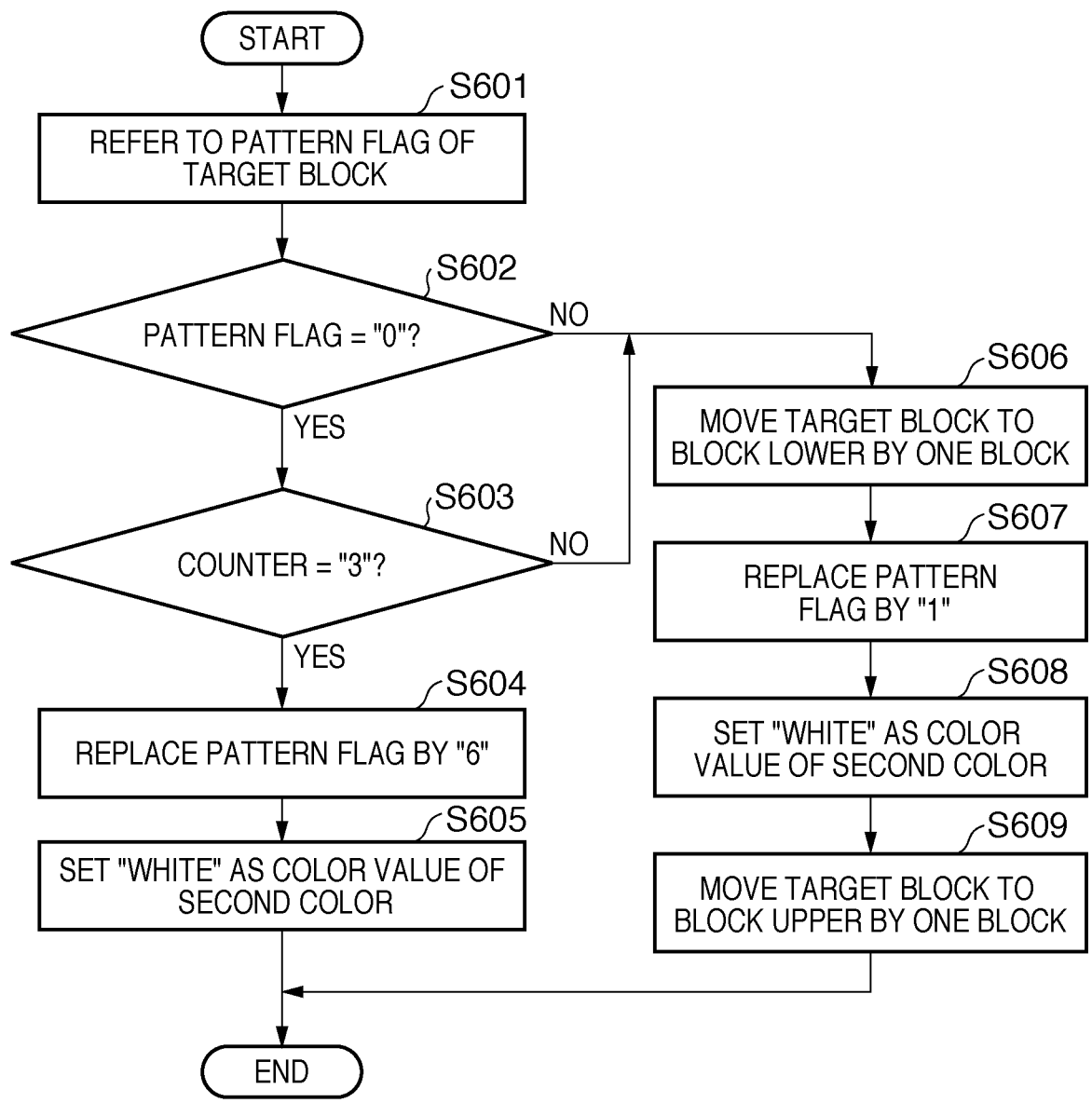
FIG. 12 is a flowchart showing thinning processing according to the first embodiment.

FIG. 12 is a flowchart showing the sequence of the thinning processing according to this embodiment. The thinning processing is executed by the image processing unit 212. When the thinning processing starts, the image processing unit 212 refers to a pattern flag of the target block (S601). If the value of the pattern flag is "0" (YES in step S602), the image processing unit 212 refers to the value of the counter to check the width (S603). If the value of the counter is "3" (YES in step S603), the image processing unit 212 rewrites the pattern flag by "6" (S604). Since the pattern flag "6" is configured by two colors, the image processing unit 212 adds "white" as the color value of the second color (S605). In this case, pixel data indicating white is stored at a corresponding position in a second/third/fourth color storage area in the memory space shown in FIG. 6. Then, the image processing unit 212 ends this processing sequence. If the pattern flag of the target block is not "0" (NO in step S602), or if the pattern flag is "0" but the value of the counter is not "3" (NO in step S603), the image processing unit 212 moves the target block to a block at a position lower by one block (S606). In this case, the case in which the value of the counter is not "3" indicates that the value of the counter is "4". Then, the image processing unit 212 rewrites the pattern flag of the target block after movement by "1" (S607). Then, the image processing unit 212 sets "white" as the color value of the second color, and adds that pixel value (S608). In this case, pixel data indicating white is stored at a corresponding position in the second/third/fourth color storage area in the memory space shown in FIG. 6.

Finally, the image processing unit 212 moves the target block position to a block at a position upper by one block (S609). Then, the image processing unit 212 ends this processing sequence. As described above, the thinning processing is implemented by rewriting a pixel value (color value) at a pixel position which corresponds to the second pixel position from the lower end and the second pixel position from the right end in a pixel region (block) having a width equal to or larger than the predetermined width. The processing result of input data shown in FIG. 15A is as shown in FIG. 15B.

Note that this embodiment applies processing to a black color as a target, but may apply the processing to a different color. In this embodiment, the processing advances toward the upper right end to set the origin at the lower left position on encoded image data. However, the present invention is not limited to this, and the origin and the direction of the processing may be changed as needed. In this case, the value of the pattern flag to be converted in the thinning processing (FIG. 12) has to be changed, needless to say. In the tailing-blur measure processing, the value of a pixel whose value is to be converted is not limited to a pixel position corresponding to the second pixel position from the lower end and the second pixel position from the right end. That is, another pixel position may be selected as long as it does not influence an image to be output and a tailing-blur phenomenon can be prevented.

With the aforementioned arrangement, the tailing-blur measure processing can be executed without expanding compressed data. Thus, the memory size and memory bus bands can be saved. Also, the need for the expansion processing of compressed data for the tailing-blur measure can be obviated, thus also reducing the processing load.

Second Embodiment

This embodiment will explain another embodiment associated with the thinning processing of the tailing-blur measure processing described in the first embodiment. The tailing-blur measure processing executes image processing for detecting a line in the main scan direction in an image, and thinning out a line lower part. In order to prevent explosion and scattering of toners at the time of fixing, the amounts of applied toners may be suppressed by executing color-reduction processing in place of the thinning processing, thus obtaining the same effect. Hence, a method which replaces the thinning processing of the tailing-blur measure processing described in the first embodiment by color-reduction processing will be described below.

[Tailing-blur Measure Processing]

Figure 15C:
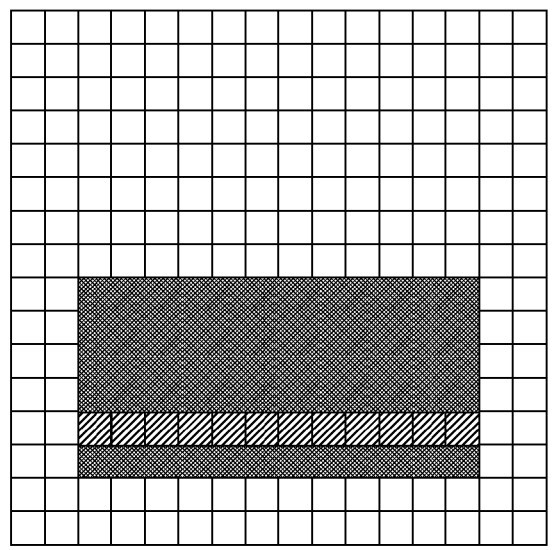

FIG. 13 is a flowchart showing tailing-blur measure processing according to the second embodiment. This processing is also executed by an image processing unit 212 as in the first embodiment. The following description will be given under the assumption that each of R, G, and B data is input as 8 bits to have 256 gradation levels, and data are dot sequential 8-bit data, that is, one pixel is expressed by 24-bit data. This processing sequence is implemented when a CPU 105 reads out and executes a program stored in, for example, a memory 106. The image processing unit 212 sets a target position at an origin (a lower left position in this embodiment) on raster image data (S701). The image processing unit 212 executes line checking processing of a 2×2 pixel block located at the target position (S702). The image processing unit 212 sets an up-and-down direction as a width, and checks whether or not the line checking processing detects a region includes successive pixels that define a predetermined width (S703). In this case, the predetermined width is defined by three or four pixels. That is, when a counter value is 3 or 4, the image processing unit 212 judges that a pixel region which has the predetermined width is detected. If it is judged that a pixel region having the predetermined width is detected (YES in step S703), the image processing unit 212 applies color-reduction processing to two pixels which are located at a second pixel position from the lower end of that region (S704). After the line checking processing and color-reduction processing, if the target position does not reach the end position in the Y direction (the upper end of image data) (NO in step S705), the image processing unit 212 moves the target position upward by one block (S707), and the process returns to step S702 to execute the next line checking processing. If the target position reaches the upper end (YES in step S705), the image processing unit 212 checks whether or not the target position reaches the end position in the X direction (the right end of image data) (S706). If the target position does not reach the right end (NO in step S706), the image processing unit 212 moves the target position to the right by one block (S708), and the process returns to step S702 to execute the next line checking processing. If the target position reaches the right end (YES in step S706), the image processing unit 212 ends the tailing-blur measure processing. With this tailing-blur measure processing, when raster image data shown in FIG. 15A is input, raster image data shown in FIG. 15C is output. FIG. 18 shows code data corresponding to FIG. 15C.

[Color-Reduction Processing]

Figure 14:
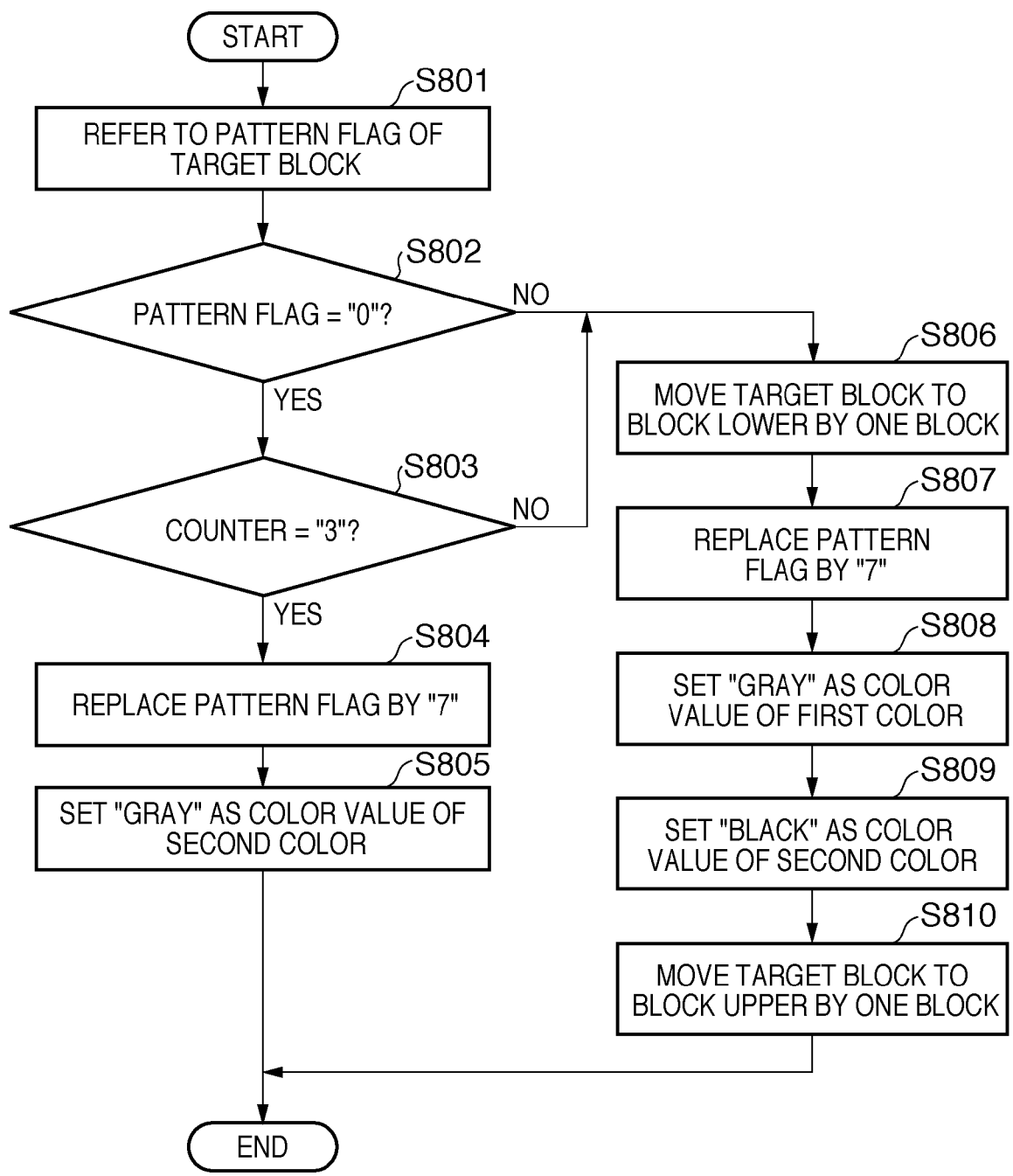
FIG. 14 is a flowchart showing color-reduction processing according to the second embodiment.

FIG. 14 is a flowchart showing the sequence of the color-reduction processing according to this embodiment. The color-reduction processing is executed by the image processing unit 212. When the color-reduction processing starts, the image processing unit 212 refers to a pattern flag of the target block (S801). If the value of the pattern flag is "0" (YES in step S802), the image processing unit 212 refers to the value of the counter to check the width (S803). If the value of the counter is "3" (YES in step S803), the image processing unit 212 rewrites the pattern flag by "7" (S804). Since the pattern flag "7" is configured by two colors, the image processing unit 212 adds "gray" as the color value of the second color (S805). In this case, pixel data indicating gray is stored at a corresponding position in a second/third/fourth color storage area in a memory space shown in FIG. 6. Then, the image processing unit 212 ends this processing sequence.

If the pattern flag of the target block is not "0" (NO in step S802), or if the pattern flag is "0" but the value of the counter is not "3" (NO in step S803), the image processing unit 212 moves the target block position to a position lower by one block (S806). Then, the image processing unit 212 rewrites the pattern flag of the target block after movement by "7" (S807). Then, the image processing unit 212 rewrites the color value of the first color by a "gray" pixel value (S808). Furthermore, the image processing unit 212 adds "black" as the color value of the second color (S809). In this case, pixel data indicating gray is stored at a corresponding position in a first color storage area in the memory space shown in FIG. 6, and pixel data indicating black is stored at a corresponding position in the second/third/fourth color storage area in the memory space shown in FIG. 6. Finally, the image processing unit 212 moves the target block position to a position upper by one block (S810). Then, the image processing unit 212 ends this processing sequence. As described above, the color-reduction processing is implemented by rewriting color values of pixels in a portion which corresponds to the second line position from the lower end of a black color part in a 2×2 pixel block judged as a line.

Note that this embodiment applies processing for rewriting black as a color to be rewritten by gray, but may apply the processing using different colors. Also, pixel positions where color values are to be replaced are not limited to the aforementioned positions. Color values of pixels at other positions may be converted as long as these pixels can be expected to obtain an effect of preventing a tailing-blur phenomenon by replacing their color values.

With the aforementioned arrangement, the tailing-blur measure processing can be executed without expanding compressed data. Thus, the memory size and memory bus bands can be saved. Also, the need for the expansion processing of compressed data for the tailing-blur measure can be obviated, thus also reducing the processing load.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-143921, filed Jun. 24, 2010, which is hereby incorporated by reference herein in its entirety.

What is claimed is:

1. An image processing apparatus which applies image processing to encoded image data, wherein the encoded image data includes color information and color layout information identified in each of blocks which are extracted from raster image data, said apparatus comprising:
   a detection unit configured to detect, based on the color information and the color layout information included in the encoded image data, a region including successive pixels having identical color information, the number of the successive pixels being larger than a predetermined value; and
   a conversion unit configured to convert color information of a pixel corresponding to a predetermined position in the region, and layout information of a block including the pixel at the predetermined position, of a plurality of blocks including the region detected by said detection unit.

2. The apparatus according to claim 1, wherein said detection unit detects a region of a rectangle of pixels having a black pixel value.

3. The apparatus according to claim 1, wherein said conversion unit converts a value of the color information of the pixel at the predetermined position by a white pixel value.

4. The apparatus according to claim 1, wherein said conversion unit converts a value of the color information of the pixel at the predetermined position by a color-reduced value.

5. The apparatus according to claim 1, wherein the predetermined value used when said detection unit detects the region is a value which is larger than the number of pixels that configure the block in a direction to scan the region.

6. The apparatus according to claim 1, wherein the predetermined number of pixels which configure the block corresponds to 2×2 pixels.

7. The apparatus according to claim 6, wherein the predetermined value used when said detection unit detects the region corresponds to three pixels.

8. The apparatus according to claim 3, wherein the pixel at the predetermined position is a pixel which is located in a column at a second pixel position from a lower end of the region, and is located at every other pixel position in the column at the second pixel position.

9. The apparatus according to claim 4, wherein the pixel at the predetermined position is a pixel which is located in a column at a second pixel position from a lower end of the region.

10. A control method of an image processing apparatus which applies image processing to encoded image data, wherein the encoded image data includes color information and color layout information identified in each of blocks which are extracted from raster image data, the method comprising:
   a detection step of detecting, based on the color information and the color layout information included in the encoded image data, a region including successive pixels having identical color information, the number of the successive pixels being larger than a predetermined value; and
   a conversion step of converting color information of a pixel corresponding to a predetermined position in the region, and layout information of a block including the pixel at the predetermined position, of a plurality of blocks including the region detected in the detection step,
   wherein at least one of the steps is carried out by a processor of the image processing apparatus.

11. A non-transitory computer-readable medium storing a program, the program controlling a computer to function as:
   a detection unit configured to detect, based on color information and color layout information included in encoded image data, a region including successive pixels having identical color information, the number of the successive pixels being larger than a predetermined value, wherein the encoded image data includes the color information and the color layout information identified in each of blocks which are extracted from raster image data; and a conversion unit configured to convert color information of a pixel corresponding to a predetermined position in the region, and layout information of a block including the pixel at the predetermined position, of a plurality of blocks including the region detected by said detection unit.

* * * * *